United States Patent [19]

Mori

[11] Patent Number: 5,136,658
[45] Date of Patent: Aug. 4, 1992

[54] NUMBER PLATE IMAGE DETECTING APPARATUS

[75] Inventor: Kazuhiro Mori, Yokohama, Japan

[73] Assignee: Kabushiki Kaisha Toshiba, Kawasaki, Japan

[21] Appl. No.: 608,301

[22] Filed: Nov. 2, 1990

[30] Foreign Application Priority Data

Nov. 8, 1989 [JP] Japan ................... 1-288847

[51] Int. Cl.$^5$ .............................................. A06K 9/00
[52] U.S. Cl. .................................... 382/1; 382/9; 382/24; 382/48
[58] Field of Search .......... 382/1, 57, 9, 48, 10, 382/16, 54, 19, 24; 358/261.1

[56] References Cited

U.S. PATENT DOCUMENTS

| | | | |
|---|---|---|---|
| 3,201,752 | 8/1965 | Rabinow | 382/9 |
| 4,292,622 | 9/1981 | Henrichon, Jr. | 382/9 |
| 4,567,609 | 1/1986 | Metcalf | 382/9 |
| 4,633,502 | 12/1986 | Namba | 382/9 |
| 4,817,166 | 3/1989 | Gonzalez et al. | 382/1 |
| 4,878,248 | 10/1989 | Shyu et al. | 382/10 |

Primary Examiner—Joseph Mancuso
Attorney, Agent, or Firm—Oblon, Spivak, McClelland, Maier & Neustadt

[57] ABSTRACT

Binary image data is obtained from image data including a number plate of a vehicle which is picked up by a TV camera. Contrast image data of vertical and horizontal components are obtained, respectively, from the binary image data. An image having a continuous region whose size or area falls outside a predetermined range is erased. Subsequently, the vertical and horizontal contrast image components are combined with each other.

13 Claims, 9 Drawing Sheets

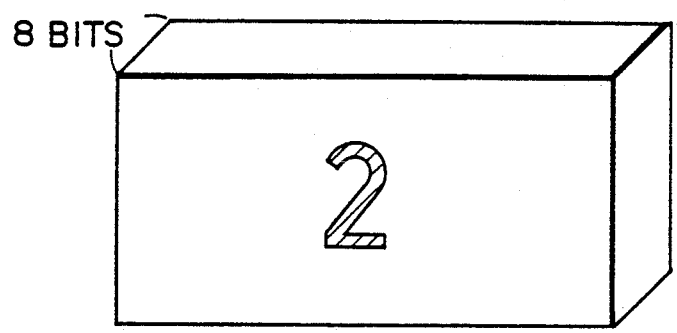
F I G. 6
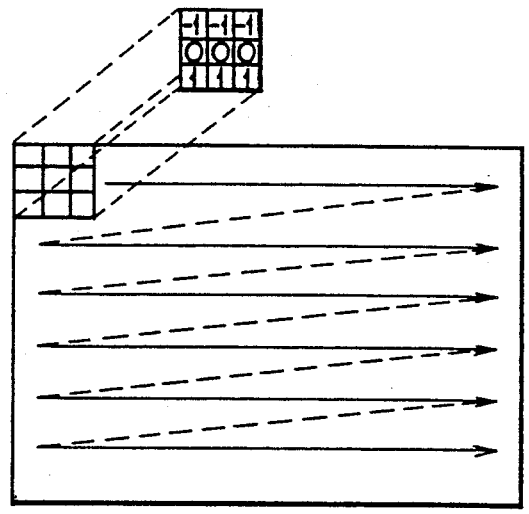
F I G. 7  F I G. 8

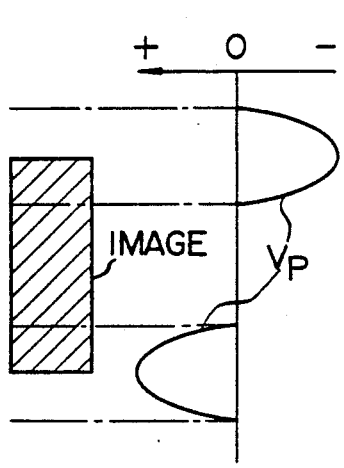
FIG. 9
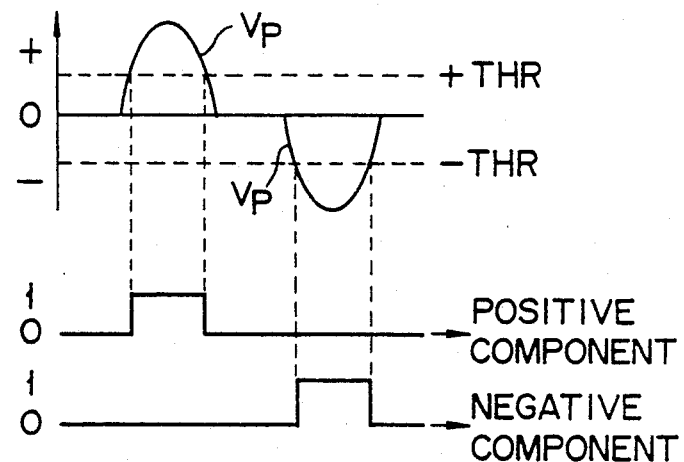
FIG. 10
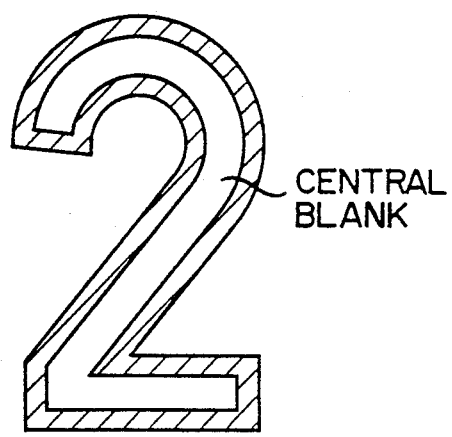
FIG. 11
FIG. 12

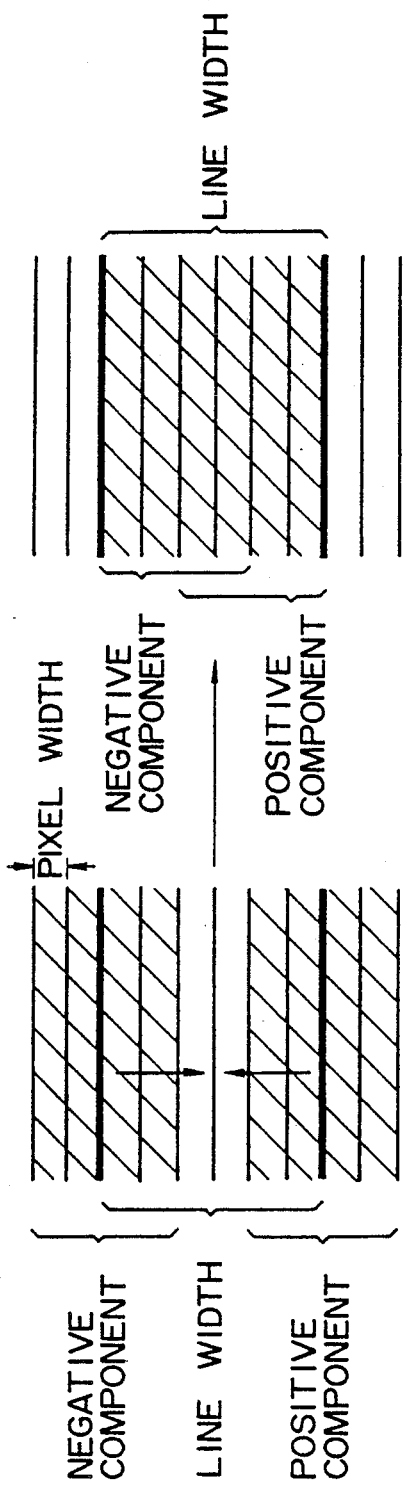
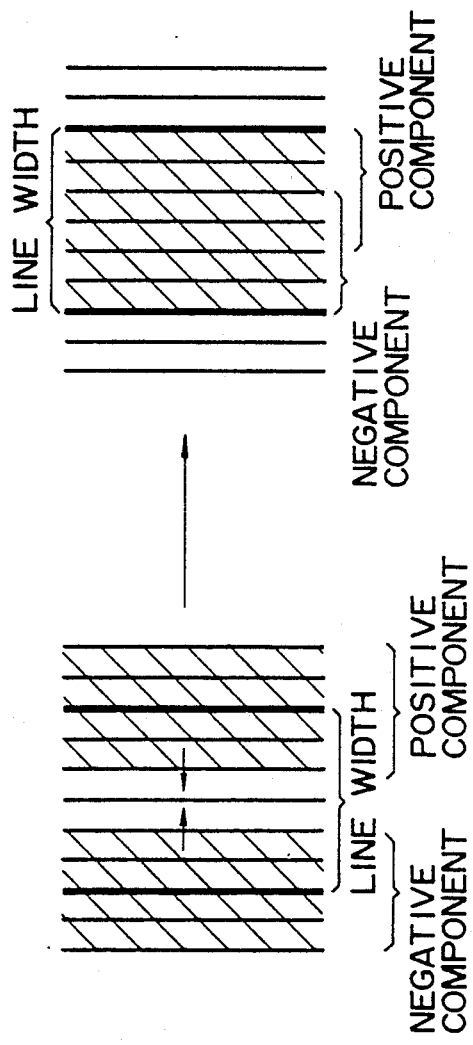
FIG. 13
FIG. 14

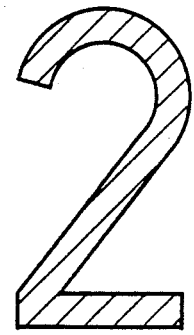
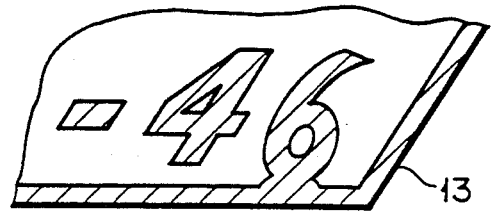
F I G. 15    F I G. 16
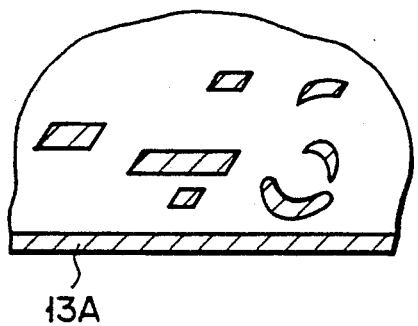
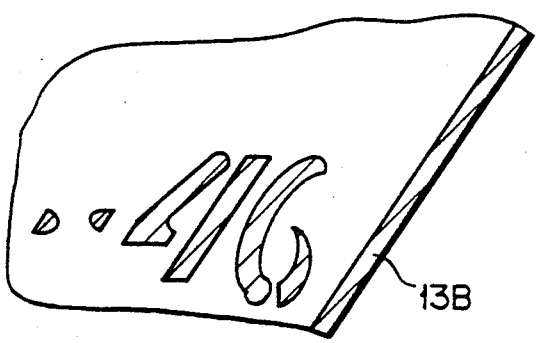
F I G. 17A    F I G. 17B

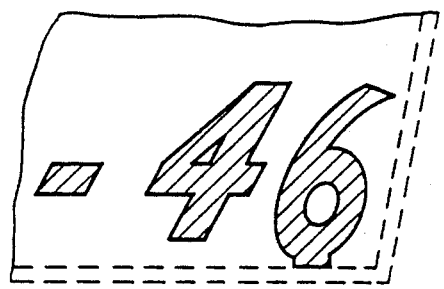
F I G. 18
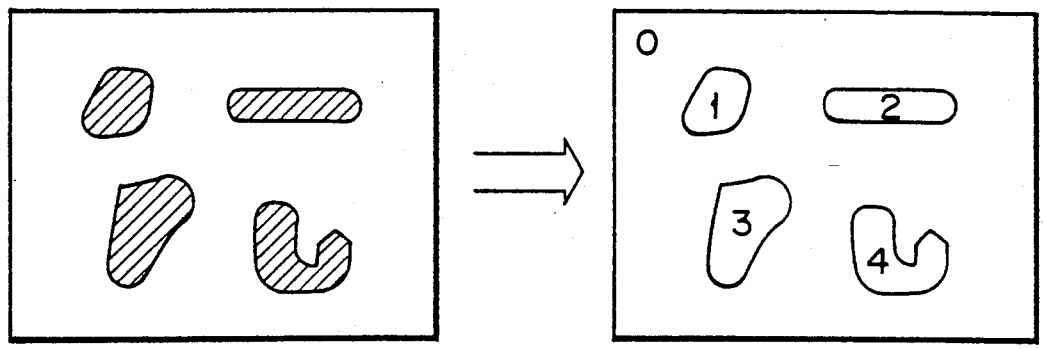
F I G. 19
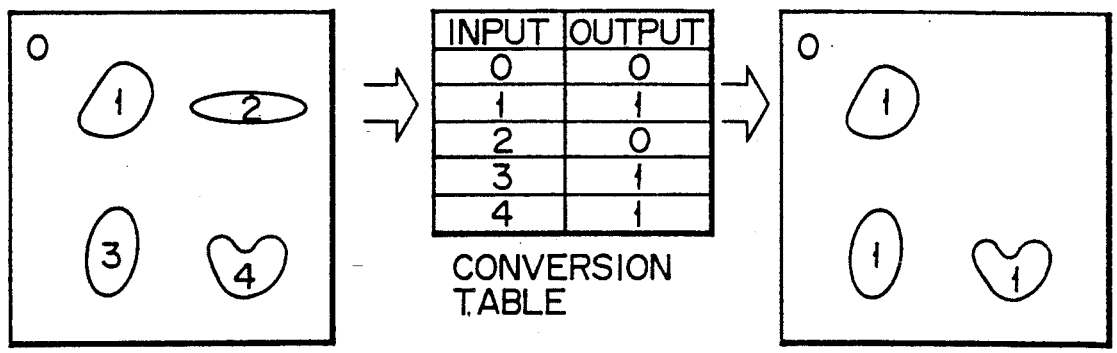
F I G. 20

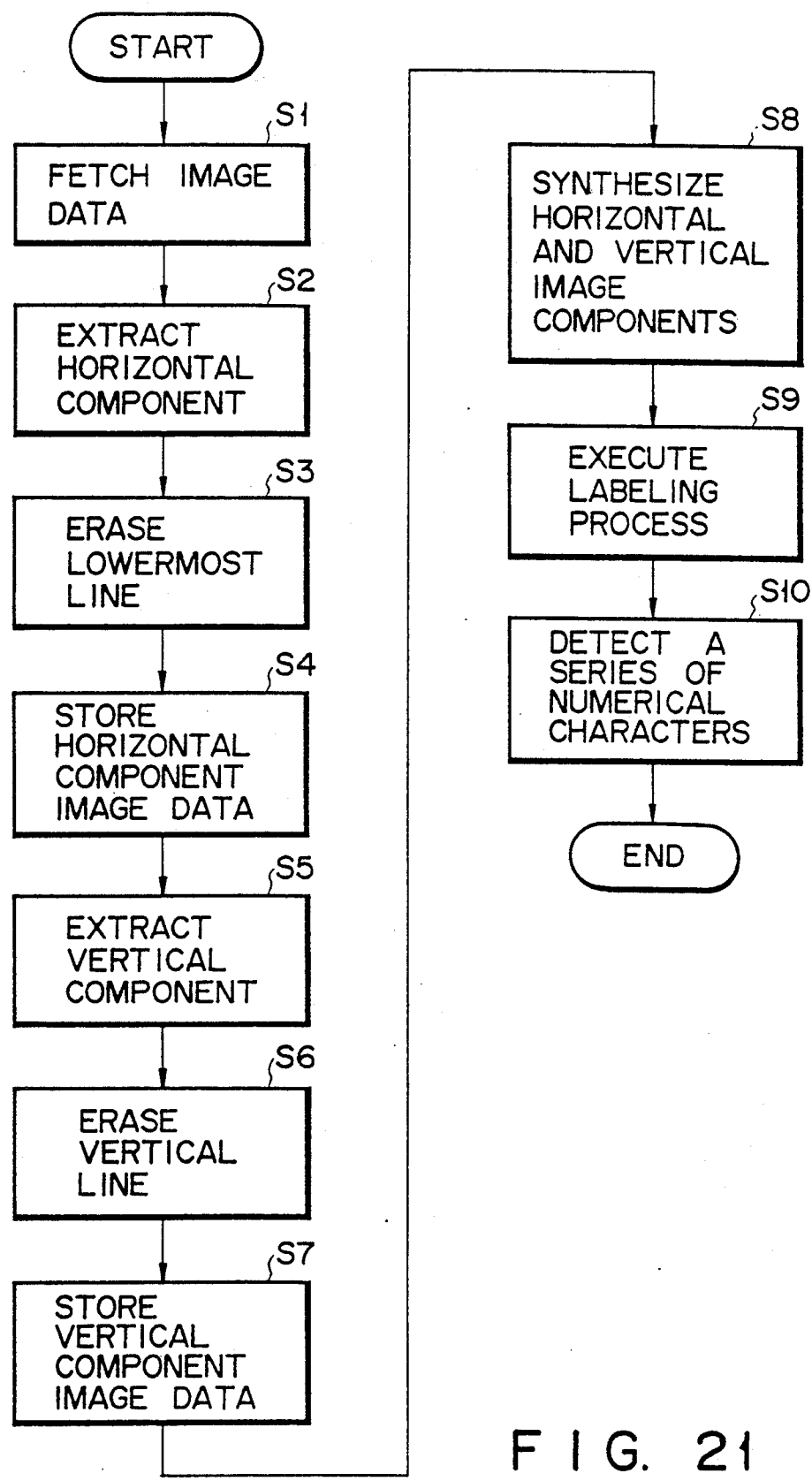
F I G. 21

5,136,658

NUMBER PLATE IMAGE DETECTING APPARATUS

BACKGROUND OF THE INVENTION

1. Field of the Invention

The present invention relates to a number plate image detecting apparatus for picking up a scene image including a number plate of a vehicle, e.g., an automobile, by using a television camera (to be referred to as a TV camera hereinafter), and detecting an image of a number plate region from the scene image.

2. Description of the Related Art

Recently, a technique of automatically reading number plate information of a vehicle (automobile) entering a toll road such as an expressway has been required to prevent illegal passage by means of exchange of passes, for example, or to automatically collect a toll.

Published Unexamined Japanese Patent Application No. 60-193084 discloses a technique for such a requirement. In this technique, a vehicle which enters a road is detected first by a photosensor, and its front image is picked up by a TV camera. The obtained image data is then subjected to contrast detection by means of spatial filtering in consideration of a contrast between the numerals painted on the number plate and the background. At the same time, binary quantization is performed by using a predetermined threshold value in such a manner that, for example, a numeral portion is set at "1" and a background portion is set at "0". In the obtained binary image, continuous regions of "1" are analyzed to detect an image region having a predetermined size, in which, for example, four numerals are horizontally aligned. With this operation, a number plate region can be detected. In such detection processing, however, since a number plate has a plate frame, when the number plate is inclined with respect to a field of view of the TV camera, the following problem may be posed. In a binary contrast image, continuous regions of numerals and images located close thereto, e.g., continuous regions constituted by horizontal and vertical components of the plate frame may be in contact with each other, interfering with analysis of the continuous regions and causing detection errors.

SUMMARY OF THE INVENTION

As described above, the present invention has been made to prevent the problem that in a binary contrast image, objective continuous regions of characters and adjacent continuous regions constituted by horizontal or vertical components of a plate frame are in contact with each other to interfere with accurate analysis of the objective continuous regions, resulting in detection errors, and has as its object to provide a number plate detecting apparatus which can reliably eliminate continuous regions constituted by horizontal or vertical components of a plate frame which tend to be in contact with the objective continuous regions of characters, thus preventing detection errors of a plate region.

In order to achieve the above object, according to the present invention, there is provided an image detecting apparatus comprising photoelectric conversion means for picking up a scene image including a target image and photoelectrically converting the obtained image, binary quantization means for detecting a contrast of image data obtained by the photoelectric conversion means as a binary image, measuring means for measuring shape data, such as a size or an area, of each continuous region in the contrast image obtained by the binary quantization means, and target image detecting means for detecting the target image including a series of characters and numerals on the basis of the shape data measured by the measuring means, wherein vertical and horizontal components of the contrast image are obtained, respectively, a continuous region, of the horizontal and vertical components, having a size or an area which falls outside a predetermined range, is erased, and the horizontal and vertical components are subsequently combined with each other.

When a contrast image is to be obtained, vertical and horizontal components are respectively obtained first, and a horizontal component having a size or an area which falls outside a predetermined range is erased on the basis of the fact that a continuous region formed by a horizontal component of a peripheral portion of a target image including characters and numerals, e.g., a plate frame is long in the horizontal direction. A similar process is performed with respect to the vertical components. After this processing, the processed horizontal components are combined with the processed vertical components. With this operation, continuous regions constituted by horizontal and vertical components of a noise image such as the frame image, which tend to be in contact with continuous region of characters, are eliminated, thus preventing detection errors of the target image regions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 6 shows a data structure of an input image input to the binary circuit of FIG. 5;

FIG. 7 shows a weighting coefficient in a horizontal direction differentiation used in the structure of FIG. 5;

FIG. 8 is a diagram for showing a function of a spatial filtering;

FIG. 9 is a diagram showing a differentiation process;

FIG. 10 is a view for explaining an operation of a threshold value processing for the differentiated image data;

FIG. 11 shows a weighting coefficient in a vertical direction differentiation;

FIG. 12 shows a central blank phenomenon of an image processed in the differentiation/binary process;

FIG. 13 is a view for explaining a shift operation of image data at a horizontal component OR gate section;

FIG. 14 is a view for explaining a shift operation of image data at a vertical component OK gate section;

FIG. 15 show one example of an output image from a circuit 5;

FIG. 16 shows an image in which a continuous region of numerals and a horizontal part of the number plate are contacted;

FIGS. 17A and 17B show horizontal and vertical components of a contrast image, respectively;

FIG. 18 shows an image of continuous regions in which unnecessary continuous region is deleted;

FIG. 19 is a diagram to show a labeling operation;

FIG. 20 is a diagram showing an operation in which an image having a specified label is deleted; and FIG. 21 is a flowchart for explaining an operation of the embodiment of FIG. 3.

DETAILED DESCRIPTION OF THE PREFERRED EMBODIMENTS

Figure 1:
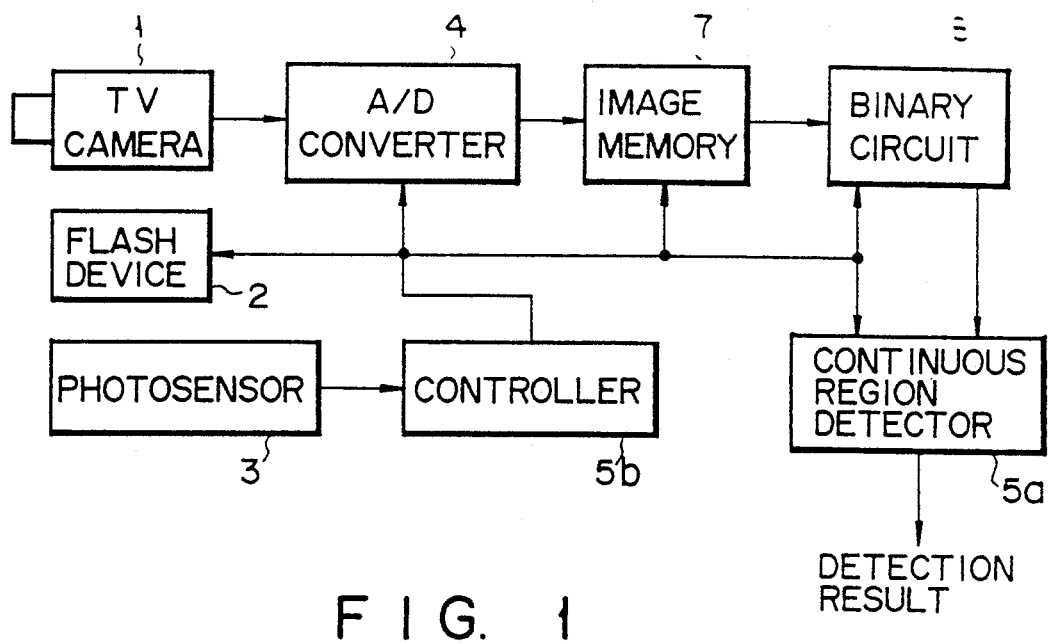
FIG. 1 is a block diagram for explaining a function of an embodiment of the present invention.
Figure 2:
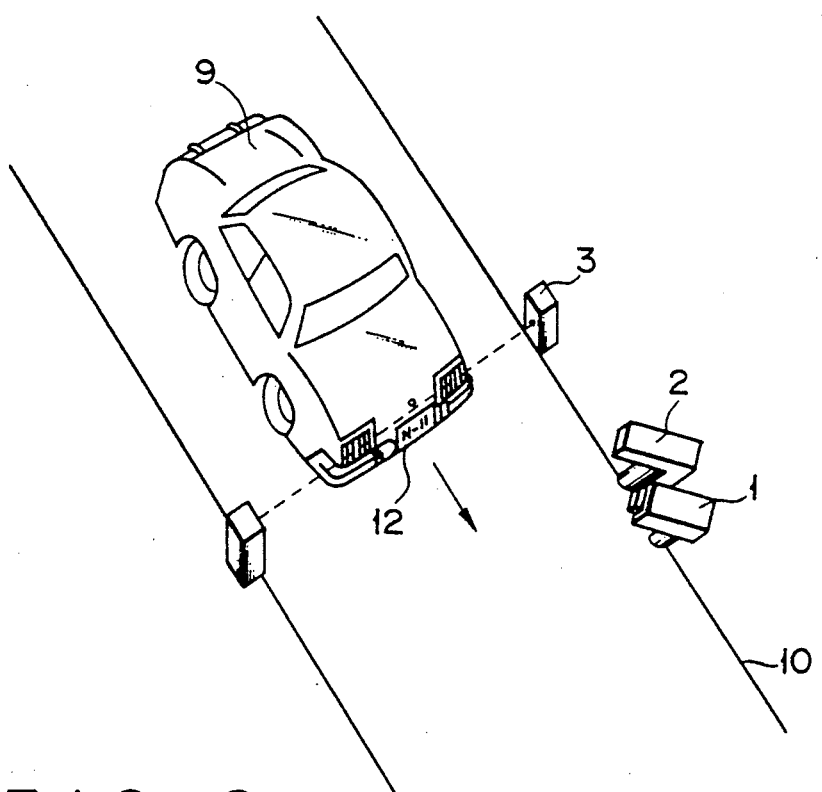
FIG. 2 is a schematic view showing an arrangement of the embodiment of an automobile number plate detecting apparatus to which the present invention is applied.

FIG. 1 shows an arrangement of a number plate detecting apparatus according to one embodiment of the present invention. The apparatus comprises a TV camera 1 as a photoelectric conversion means, a flash device 2 emitting near-infrared rays, a photosensor 3 as a vehicle detector, an A/D converter 4, an image memory 7, a binary circuit 8, a continuous region detector 5a, and a controller 5b for performing overall control More specifically, an image pick up section is constituted by, e.g., the TV camera 1, the flash device 2, and the photosensor 3. As shown in FIG. 2, the entry of a vehicle (automobile) 9 on a road 10 is detected by the photosensor 3. In response to the detection signal, the flash device 2 is operated to radiate near-infrared flash light. At the same time, a front image of the vehicle 9 including a number plate 12 is picked up by the TV camera 1. Note that near-infrared flash light is radiated to stabilize illumination conditions of the vehicle 9. Near-infrared rays are used because visible light as flash light will interfere with drivers.

The image picked up by the TV camera 1 is converted into an 8-bit digital signal by the A/D converter 4 and is temporarily stored in the image memory 7. The image stored in the image memory 7 is converted into a binary image by the binary circuit 8. In this binary image, for example, character and background portions are respectively represented by "1" and "0". If a contrast is present between a character and a background as in a number plate image, binary quantization based on contrast detection is effectively performed. For example, a binary quantization scheme based on such contrast detection is proposed by the present inventor as Japanese Patent Application No. 63-300744. This scheme will be described in detail later.

Figure 3:
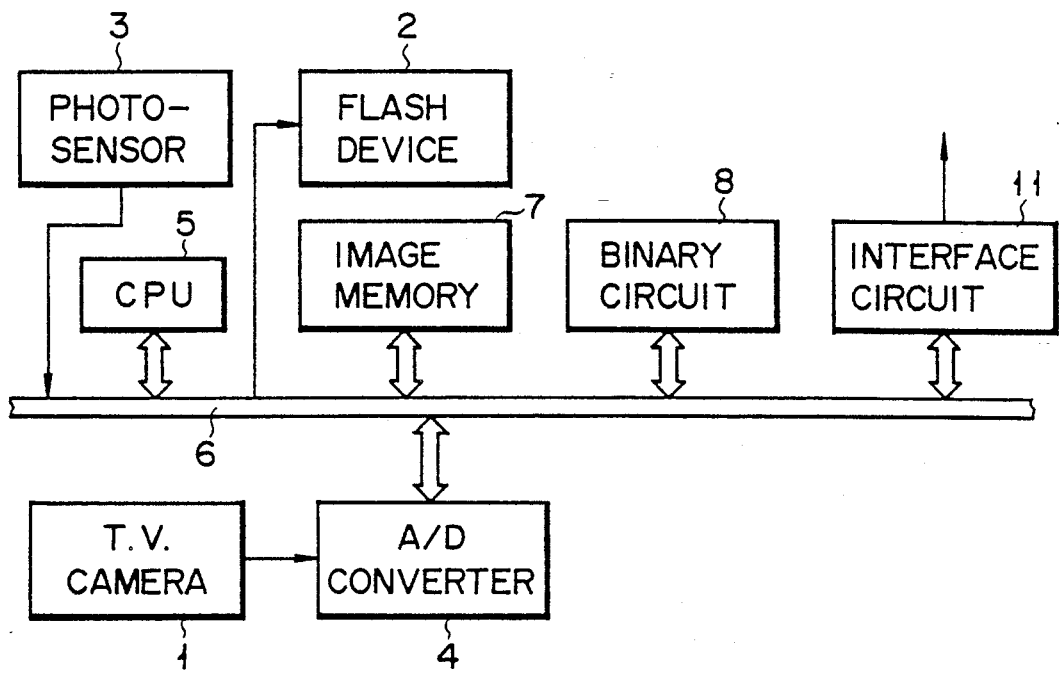
FIG. 3 is a block diagram showing an arrangement of the embodiment in FIG. 1.

The controller 5b and the continuous region detector 5a shown in FIG. 1 represent functions to be executed by a CPU 5 shown in FIG. 3 in practice. The respective components in FIG. 1 are connected to the CPU 5 through a bus line 6. An interface circuit 11 is also connected to the bus line 6 so as to supply detected number plate image data to, e.g., an external monitor unit.

Figure 4:
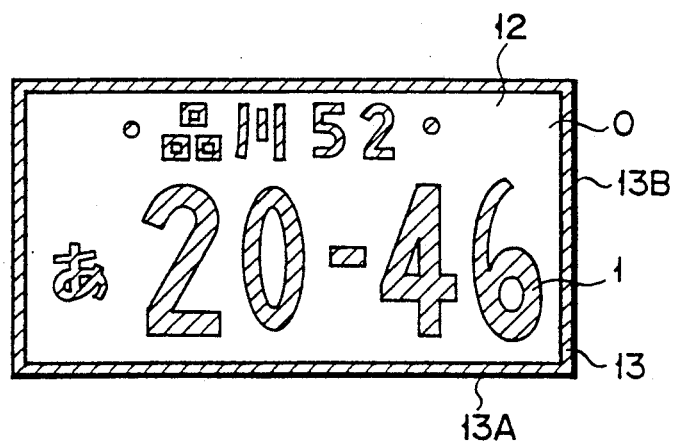
FIG. 4 is an image of a front view of a number plate picked up by a TV camera

A number plate 12 as a detection target is designed, as shown in, e.g., FIG. 4, in such a manner that four large-sized numerals "20-46" are displayed within a plate frame 13. Although small-sized characters and numerals other than the numerals "20-46" are included in the plate frame 13, they are excluded from a detection target in this case.

Figure 5:
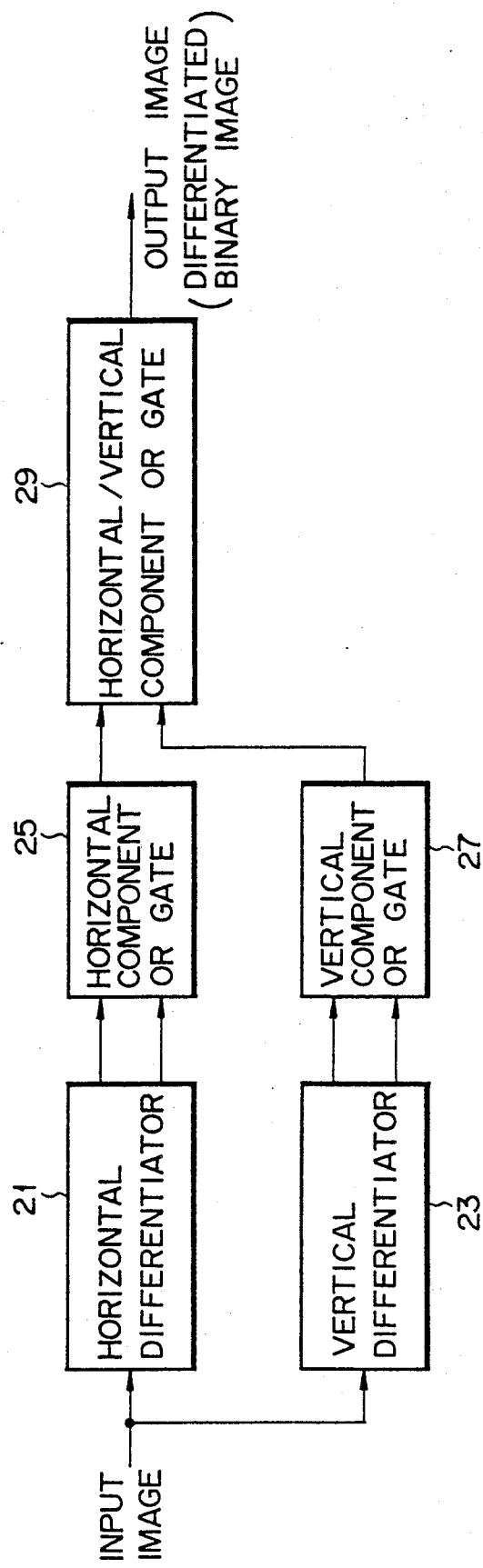
FIG. 5 is a block diagram showing a detailed arrangement of a binary circuit shown in FIG. 3.

FIG. 5 is a block diagram showing an arrangement of a linear pattern binary unit 8 used in the FIG. 3 embodiment. The linear pattern binary unit 8 shown in FIG. 5 receives an input image, e.g., the first large-sized numeral "2" in the number plate 12, which has 8-bit gradation levels in units of pixels, as shown in FIG. 6. Assume, in this case, that a black region of a character "2" portion is represented by a small value, and a white region of a background portion is represented by a large value. This input character image is supplied to a horizontal differentiator 21 and a vertical differentiator 23 to be differentiated in the horizontal and vertical directions, respectively. In the horizontal differentiator 21, spatial filtering based on a 3×3 matrix is performed by using weighting coefficients shown in, e.g., FIG. 7. As shown in FIG. 8, the 3×3 weighting coefficients are scanned in the TV scan direction, and a differential output value Vp is calculated at each point of the 3×3 matrix according to equation (1):

$$Vp = \frac{\sum_{i=1}^{9} Vi \cdot Gi}{\text{norm}} \quad (1)$$

where V1 to V9 are the values of the respective points of the 3×3 matrix, Gi (G1 to G9) are the weighting coefficients corresponding to the respective points of the 3×3 matrix, and norm is the normalized value.

As shown in FIG. 9, the differential output value Vp exhibits a large value in the positive direction when it rises from a small value to a large value in the horizontal direction, whereas it exhibits a large value in the negative direction when it rises from a large value to a small value. As shown in FIG. 10, a differential image is subjected to binary quantization in such a manner that a value larger than the absolute value of a threshold value (THR) is set at "1", and a value smaller than the absolute value is set at "0". With this operation, the horizontal differentiator outputs the respective positive and negative components. Similar processing is performed in the vertical differentiator 23 to output the respective positive and negative components in the vertical direction in accordance with the weighting coefficients shown in FIG. 11.

The positive and negative components output from the horizontal and vertical differentiators 21 and 23 are respectively supplied to a horizontal component OR gate 25 and a vertical component OR gate 27. Since only the outline of the character "2" is detected by the differentiators 21 and 23, if these components are combined with each other without any change, a binary image having a blank at its center is formed, as shown in FIG. 12. For this reason, in the horizontal and vertical component OR gates 25 and 27, the respective components are shifted to the center in the horizontal and vertical directions by the number of pixels corresponding to an amount sufficient to fill the central blank so that the combined components have a predetermined line width. More specifically, in the horizontal component OR gate 25, if a differential binary image is obtained with respect to, e.g., a character having a line width corresponding to 6 pixels, an OR operation is performed by shifting the negative component downward by 2 pixels, and shifting the positive component upward by 2 pixels to have a line with of 6 pixels, as shown in FIG. 13. Similarly, in the vertical component OR gate 27, an OR operation is performed by shifting the negative component to the right by 2 pixels, and shifting the positive component to the left by 2 pixels, as shown in FIG. 14. With the above-described operations, the horizontal and vertical components respectively obtained by the horizontal and vertical component OR gates 25 and 27 are combined with each other in a horizontal/vertical component OR gate 29, thus obtaining a good differential binary image having no central blank, as shown in FIG. 15.

In the above embodiment, the input image data is 8-bit data. However, the present invention is not limited to this. In addition, in the embodiment, it is assumed that a black region of a character portion has a small value, and a white region of a background portion has a large value. It is, however, apparent that the present invention is not limited to this. Furthermore, in the embodiment, the spatial filtering is performed by using 3×3 weighting coefficients. The present invention is not limited to this, but for example, 4×4 weighting coefficients or the like can be used. Although the values shown in FIGS. 7 and 11 are used as differential coefficients, any combination of differential coefficients may be used. In the above embodiment, positive and negative components are respectively shifted to the center by 2 pixels so as to be combined with each other. However, the number of pixels by which each component is shifted is determined by a width of the central blank and hence is not limited to 2 pixels. In addition, two components need not be shifted in the same manner. Only one of them may be shifted toward the other.

According to the above-described binary quantization scheme, a contrast image can be obtained, as shown in FIG. 4. If, however, a number plate is attached to the front surface of a vehicle so as to be inclined forward, the TV camera 1 may pick up an image in which the gap between a continuous region of a character portion and a continuous region formed by a lower horizontal component of the plate frame 13 is reduced to cause the two continuous regions to contact with each other, as shown in FIG. 16.

For this reason, with respect to an input image, each of contrast images constituted by horizontal components (see FIG. 17A) and vertical components (see FIG. 17B) is obtained first. According to the above-described binary quantization scheme, a contrast image constituted by horizontal components and a contrast image constituted by vertical components can be easily obtained, respectively. Of the obtained horizontal and vertical components, continuous regions 13A and 13B which exceed a predetermined length in the horizontal and vertical directions are detected and erased by known labeling processing. Subsequently, the horizontal and vertical components are combined with each other. With this operation, the continuous regions formed by the horizontal and vertical components of the plate frame 13, which tend to be in contact with the target continuous regions of the characters, can be erased, as shown in FIG. 18.

As is well known, labeling processing is processing for putting a label on each continuous region, as shown in FIG. 19. At the same time, the coordinates of the circumscribed rectangle of each continuous region can be obtained. A lateral length obtained from the coordinates is compared with a predetermined length. If the length exceeds the predetermined value, an image having a corresponding label is erased.

A specific label image is erased by, e.g., DCV processing. The DCV processing is table conversion processing of images, in which preset values, in the table, corresponding to input values are output, as shown in FIG. 20. In this case, an output value, from the table, corresponding to a label representing an erase target is set to be "0", and an output value corresponding to a label representing an image not to be erased is set to be "1".

A binary image obtained by such binary quantization scheme is subjected to analysis of continuous regions in the continuous region detector 5a. In this processing, for example, vertical and lateral sizes of continuous regions, or arrangements of continuous regions are analyzed to detect a series of numerals of a number plate. One example of a device for detecting a series of numerals of a plate number is shown in, e.g., Published Unexamined Japanese Patent Application No. 60-193084.

An operation of the embodiment shown in FIG. 3 performed under a control of the CPU 5 will now be described in detail by referring to the flowchart of FIG. 21.

When a front edge of the automobile 9 is detected by the photosensor 3 in FIG. 2, a near-infrared ray is emitted from the flash device 2. The front image signal of the automobile 9 including the number plate thereof is obtained as shown in FIG. 4 from the TV camera 1 having a high sensitivity to the near-infrared ray. In step S1 in FIG. 21, the obtained image signal is converted into digital image data by the A/D converter and is stored in the image memory 7.

The image data stored in the image memory 7 is supplied to the binary circuit 8 in which steps S2 to S8 are executed. Thus, in the binary circuit 8, horizontal image components of the image data as shown in FIG. 4 are extracted in the step S2. A part of the extracted horizontal image components is shown in FIG. 17A.

Of the horizontal image components, the lowermost horizontal component corresponding to the lower frame 13A in FIG. 4 is deleted in the next step S3, and the remaining images of the horizontal image components are temporarily stored in the memory 7 in the next step S4.

Similarly, the vertical image components of the image data shown in FIG. 4 are extracted in the step S5. A part of the extracted vertical image components is shown in FIG. 17B. A vertical component 13B of the number plate 13 is included in the obtained vertical image components. The component 13B is deleted in the next step S6 and the remaining images of the vertical image components are temporarily stored in the memory 7 in the next step S7.

The horizontal and vertical image components stored in the image memory 7 are combined in the next step S8 into one combined image. A labeling operation is executed to the combined image in the next step S9.

In the step S9, a labeling process and an image deletion process for an unnecessary labeled image are successively performed for the respective horizontal and vertical image components as shown in FIGS. 19 and 20. As a result of the step S9, Japanese characters and small numerals "52" are deleted and only target series of numerals "20-46" remains in the image of FIG. 4, after the operations of labeling process and unnecessary labeled image deletion process are performed.

The image data of the target series of numerals "20-46" extracted in the step S9 is then rendered to be processed in the next step S10 in which the size of the images in the target series of numerals is measured, the measured size of the images is compared with a reference size, and the arrangement of the numerals is checked. Image data having desired continuous regions may be supplied to an external monitor apparatus via the interface 11.

As has been described above in detail, according to the present invention, when a contrast image is to be obtained, vertical and horizontal components are respectively obtained first, and a horizontal component having a size or an area which falls outside a predetermined range is erased on the basis of the fact that a continuous region formed by a horizontal component of a plate frame is long in the horizontal direction. After this processing, the horizontal components are combined with the vertical components. Therefore, a number plate detecting apparatus can be provided, which can eliminate continuous regions constituted by horizontal components of a plate frame, which tend to be in contact with continuous region of characters, thus preventing detection errors of plate regions.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image detecting apparatus comprising:
   photoelectric conversion means for picking up a scene image including a target image and for outputting a photoelectrically converted image signal;
   means for obtaining vertical and horizontal components of the converted image signal, respectively;
   first and second means for extracting an image of a continuous region from the vertical and horizontal components, respectively;
   measuring means for obtaining shape data representing at least one of size and an area of each continuous region of each component obtained by said obtaining means;
   first means for erasing a continuous region, of the horizontal components obtained by said first extracting means, having a size and an area which falls outside a predetermined range to obtain remaining horizontal components;
   second means for erasing a continuous region, of the vertical components obtained by said second extracting means, having a size and an area which falls outside a predetermined range to obtain remaining vertical components; and
   means for subsequently combining the obtained remaining horizontal and vertical components with each other.

2. An image detecting apparatus according to claim 1, wherein said target image is a series of numerals of a plurality of digits representing a registered number on a number plate of an automobile; and
   said photoelectric conversion means includes a photosensor for detecting the automobile to output a detection output, a flash device for emitting a near-infrared ray in response to the detection output, a TV camera for receiving a reflected near-infrared ray from the automobile to obtain an image signal of a front image of the automobile including the number plate, and means for obtaining digital image data from the image signal.

3. An image detecting apparatus according to claim 2, wherein said measuring means includes means for comparing each of said components with a size of the numbers on the number plate.

4. An image detecting apparatus according to claim 1, wherein said photoelectric conversion means includes means for forming binary image-data of said image signal.

5. An image detecting apparatus according to claim 4, wherein said binary image data forming means includes differentiation means for specially differentiating in horizontal and vertical directions said image data, binary quantization means for binary quantizing absolute values of positive and negative components of differentiated images differentiated in horizontal and vertical directions, horizontal shifting means for shifting the positive and negative components of the binary quantized images differentiated in the horizontal direction by a number of pixels corresponding to a line width of the differentiated image data with each other, and vertical shifting mean for shifting the positive and negative components of the binary quantized image differentiated in the vertical direction by a number of pixels corresponding to a line width of the differentiated image data with each other.

6. An image detecting apparatus according to claim 1, comprising means for labeling a plurality of image segments, and
   wherein said measuring means measures sizes of labeled image segments in the horizontal and vertical directions to obtain a measuring output, and said first and second erasing means respectively erase horizontal and vertical components having a size more than a predetermined value by comparing the measuring output with a reference value.

7. An image detecting apparatus according to claim 1, wherein:
   said measuring means includes labelling means for obtaining coordinates of a circumscribed rectangle of each continuous region; and
   said measuring means compares dimensions of said rectangles with predetermined dimensions.

8. A number plate detecting apparatus comprising:
   photoelectric conversion means for picking up a scene image including a number plate of a vehicle for outputting photoelectrically converted image data;
   means for separating the converted image data from said photoelectric conversion means into vertical and horizontal components;
   first and second extracting means for extracting an image of a continuous region from the vertical and horizontal components, respectively;
   first measuring means for measuring whether or not a size and an area of the horizontal components exceed a predetermined range;
   second measuring means for measuring whether or not a size and an area of the vertical components exceed a predetermined range;
   first erasing means for erasing horizontal components exceed a predetermined range;
   second erasing means for erasing vertical components exceeding the predetermined range;

means for combining remaining horizontal components with the remaining vertical components into combined image data; and means for detecting a number on said number plate on the basis of said combined image data from said combining means.

9. An image detecting apparatus according to claim 8, wherein said measuring means includes means for comparing each of said components with a size of the numbers on the number plate.

10. An image detecting apparatus according to claim 8, wherein:

said measuring means includes labelling means for obtaining coordinates of a circumscribed rectangle of each continuous region; and said measuring means compares dimensions of said rectangles with predetermined dimensions.

11. A number plate detecting apparatus comprising:

photoelectric conversion means for picking up a scene image including a number plate of a vehicle for outputting photoelectrically converted image data;

first and second separating means for separating the converted image data from said photoelectric conversion means into vertical and horizontal components, respectively;

first measuring means for measuring whether or not a size and an area of the horizontal components exceed a predetermined range;

second measuring means for measuring whether or not a size and an area of the vertical components exceed a predetermined range;

first erasing means for erasing horizontal components exceeding the predetermined range second erasing means for erasing vertical components exceeding the predetermined range;

means for combining remaining vertical components with remaining horizontal components into combined image data; and means for detecting a number on said number plate on the basis of said combined image data from said combining means.

12. An image detecting apparatus according to claim 11, wherein said measuring means includes means for comparing each of said components with a size of the number on the number plate.

13. An image detecting apparatus according to claim 11, wherein:

said measuring means includes labelling means for obtaining coordinates of a circumscribed rectangle of each continuous region; and said measuring means compares dimensions of said rectangles with predetermined dimensions.

* * * * *